Jan. 8, 1924.  
J. OCHSNER  
1,480,220  
CART WITH SIDEWARDS TILTABLE BRIDGE  
Filed Nov. 16, 1921  
2 Sheets-Sheet 1
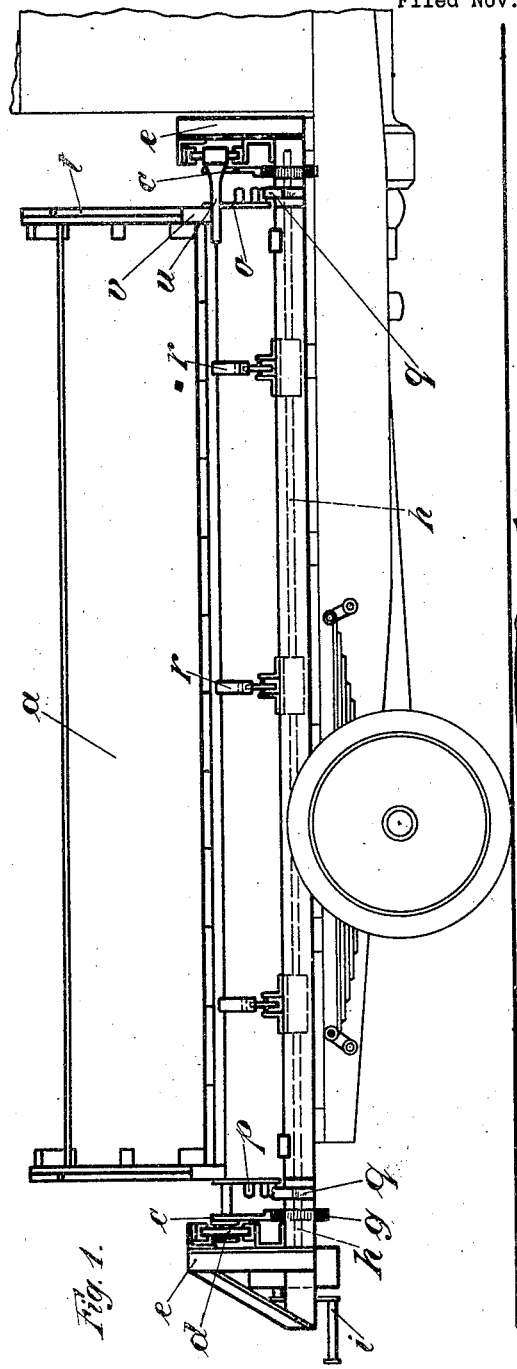
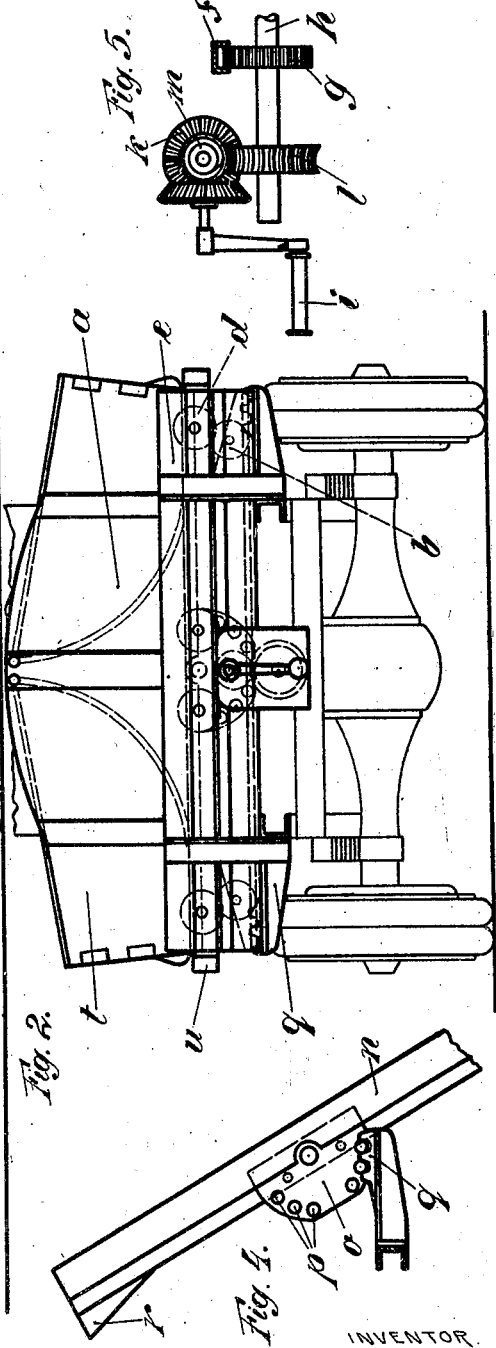
INVENTOR.  
Jacob Ochsner  
By  
his ATTORNEY.

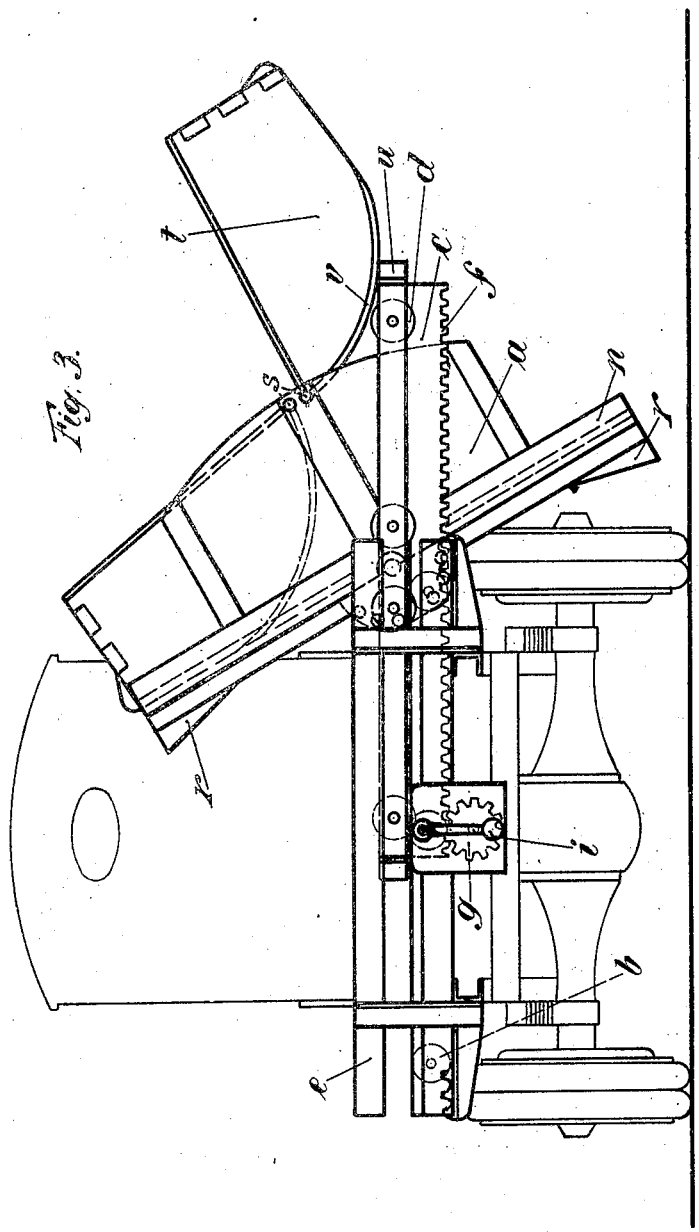

Patented Jan. 8, 1924.

1,480,220

UNITED STATES PATENT OFFICE.

JACOB OCHSNER, OF ZURICH, SWITZERLAND.

CART WITH SIDEWARDS-TILTABLE BRIDGE.

Application filed November 16, 1921. Serial No. 515,445.

*To all whom it may concern:*

Be it known that I, JACOB OCHSNER, citizen of Switzerland, residing at Zurich, in the canton of Zurich and Republic of Switzerland, have invented certain new and useful Improvements in Carts with Sidewards-Tiltable Bridges, of which the following is a specification.

My invention relates broadly to dumping carts and more particularly to certain improvements in the construction of a tilting arrangement therefor.

The invention has for its object to provide an apparatus of this character having a tiltable bridge supported at both ends in a frame which is carried by a beam capable of being adjusted outwardly from either side of the cart.

A further object of this invention is to provide an improved construction for dumping carts which is strong and durable in construction and efficient in operation and which may be employed on wagons, trucks and motor vehicles.

The invention is illustratively exemplified in the accompanying drawings, in which, Figure 1 is a side elevational view of the dumping cart supported on a motor vehicle; Figure 2 is an end elevational view of the dumping apparatus; Figure 3 is a similar view of the same showing the supporting beam extended and the body portion in tilted position; Figure 4 is a detail view of the means used to support the tilting bridge; and Figure 5 is a detail view of the bevel gear mechanism for controlling the operation of the dumping apparatus.

Referring to the drawings, *a* denotes the body of the cart which is supported on rollers *b* and near each end of which is a beam *c*. The beams *c* carry rollers *d* supported and guided in a longitudinal frame *e* forming a fixed part of the framework of the machine. Projecting below the beam and being an integral part thereof is a rack *f* which is engaged by a gear *g* carried on the shaft *h*, the latter being disposed under the body *a* and extending longitudinally through the center of the machine. The shaft *h* projects outwardly from the rear of the machine and is connected to a crank handle *i* for imparting rotary movement thereto by means of a pair of bevel gears *k*, worm gear *m* and worm wheel *l* which is mounted on the end of the shaft *h*.

The front and rear walls of the body *a* carry segmental plates *o* which project below the lower edge of the body and are provided with two sets of three pegs *p*, a set being disposed at each side of the center of the plate and arranged on an arc having the center of the radii thereof on a plane level with the centers of the rollers *d*. The pegs *p* project on a plane substantially parallel with the longitudinal plane of the cart and are adapted to engage in a pair of notches disposed in the upper edge of a plate *q* which is supported on the frame *e*. There is a plate *q* at each side of the body *a* and the notches thereof are so disposed that the pegs *p* when engaged therein tend to hold the adjusted positions of the body, as shown in Figure 4.

The bridge piece *n* carrying the body portion *a* is provided with downwardly projecting wedge shaped pieces *r* which are disposed so as to engage the periphery of the rollers *b*, in the manner hereinafter described. The inclination of the engaging surface of the wedges is directed away from the center of the body.

The longitudinal side walls of the body *a* are composed of plates *t* which are provided with angular end portions pivoted on pegs or pins *s* which in turn are carried by the upper portion of the body substantially in the center thereof. The lower edge of the plate *t* is provided with a curved rail *v* which is adapted to engage a longitudinal arm *u* carried by the beam *c*.

In operation the dumping cart is manipulated as follows: Assuming the body portion *a* and the beam *c* are in normal positions over the frame *e* of the cart, the crank handle *i* is rotated in one direction or the other, depending upon which side of the cart the load is to be deposited. This operation causes the shaft *h* to revolve and with it the gears *g*, whereupon the rack *f* and beam *c* move transversely of the cart and outwardly over the frame *e* and during this operation the wedge pieces *r* having engaged the rollers *b* the body portion will be disposed at a slight inclination. In this position the beam *c* has been moved until the lowermost pegs *p* of the plates *o* engage with the curved edge of the plates *q*, whereupon the weight of the loaded body will cause the latter to fulcrum about this pin and tilt until the two uppermost pins are seated in the notches, as shown in Figure 4. During this operation the plate $t$ is engaged along the rail $v$ by the arm $u$ and is lifted about the pins or pegs $s$ and away from the floor of the body $a$ to release the material therein. It will be noted that the dumping action of the body $a$ and the lifting movement of the plate $t$ is carried out very rapidly so that the material leaves the body $a$ in a complete charge as soon as the plate is separated from the floor of the device.

What I claim is:—

1. In a dumping arrangement for vehicle bodies, the combination with a fixed guide frame, of a body frame slidably mounted in said guide frame, a tiltable body carried by the second frame, means for moving the second frame transversely with respect to the fixed frame, and complementary engaging means carried by the fixed frame and the said body for limiting the travel of the body frame and for providing a fulcrum about which the inclination of the body frame is adjusted.

2. A dumping arrangement for vehicle bodies, as claimed in claim 1, in which the complementary engaging means comprise upright notched plates disposed at opposite ends of the fixed frame, and segmental plates depending from the body and provided with sets of projecting members disposed about an arc, the lowermost of said members being adapted to engage with and fulcrum about the adjacent notch while the other members of the set seat into the remaining notches when the body has inclined to a certain degree.

3. A dumping arrangement for vehicle bodies, as claimed in claim 1, in which the fixed guide frame carries rollers adjacent opposite ends thereof, and means carried by the body and adapted to engage the said rollers for imparting a primary tilting position of the said body frame whereby the latter assumes a slight inclination prior to its full outward movement with respect to the fixed frame.

4. A dumping arrangement for vehicle bodies, as claimed in claim 1, in which the body is provided with longitudinally pivoted side walls, and means carried by the slidable body frame for engaging the free edge of the said side walls whereby the body having assumed a certain inclination the side wall on the low side will be swung about its pivot to discharge the contents.

In testimony whereof I have affixed my signature.

JACOB OCHSNER.